Patented Dec. 9, 1952

2,621,146

UNITED STATES PATENT OFFICE 2,621,146

PRODUCTION OF STREPTOMYCIN ON SYNTHETIC MEDIUM

Halbert H. Thornberry and Harry W. Anderson, Urbana, Ill., assignors to Board of Trustees of The University of Illinois, Urbana, Ill., a nonprofit corporation of Illinois No Drawing. Application November 25, 1946, Serial No. 712,048

8 Claims. (Cl. 195—80)

This invention relates to a culture medium for the growing of microorganisms, particularly to a culture medium which may be prepared from easily obtainable, substantially pure substances.

In the culturing of microorganisms, it is necessary to provide a combination of chemical substances, such as a combination of inorganic salts and organic compounds, which the organism may utilize as food. It is known that, not only is the growth of a particular microorganism dependent upon the presence in the medium of certain substances, but also, that the production by the organism of chemical substances normally produced by it during growth is often affected greatly by the presence or absence of certain substances in the medium. In many instances, the culturing or growing of a particular microorganism may be affected readily using a particular medium and the production of certain chemical substances, which are produced during growth of the organism in another medium, inhibited entirely. In other instances, it has been possible by selecting and adjusting the medium, to increase greatly the amount of a desired chemical substance formed by the organism over that formed by it when growing in other media.

In growing microorganisms for the production of desired chemical substances, and particularly in the growing of Streptomyces griseus (Krainsky) (Waksman and Henrici: J. Bact. 46 337 (1943)), formerly Actinomyces griseus (Krainsky) (Bergey, D. H. et al.: Bergeys Manual of Determinative Bacteriology, Williams and Wilkins, Baltimore (1939); Schatz et al.: Proc. Soc. Biol. Med. 55 669-9 (1944); Waksman: Soil Science 8 71 (1919); Waksman: J. Bact. 39 549-88 (1940)) for the production of streptomycin, it has heretofore usually been the custom to use certain readily available commercial by-products as the basis for the medium. Corn steep liquor, remaining after the production of starch from corn as a watery, not entirely clear, solution, and beef extract paste, or mixtures thereof, have been used. To these have been added a variety of inorganic salts and organic substances in an attempt to increase the yield of streptomycin. This procedure has certain disadvantages in that the supply of corn steep liquor fluctuates widely and is often available only at a considerable distance from the point where it is to be used. Inasmuch as the proportion of solids in corn steep liquor is low, the transportation of the liquor for any considerable distance is burdensome and expensive. Furthermore, the liquor is of variable composition and may also change in composition during shipping and storage so that the production of streptomycin by a microorganism, using corn steep liquor as the basis of the medium, frequently leads to a luxuriant growth of the organism but to the production of little or no streptomycin. Beef extract paste offers similar disadvantages. At best, the yield of streptomycin using such a medium is erratic and the process expensive to carry out. The desirability of being able to prepare a medium under controlled conditions and using substantially pure substances for the growth of a streptomycin-producing organism which will lead consistently to a high rate of production of streptomycin is apparent.

It is therefore an object of the present invention to provide a culture medium for the growing of microorganisms which can be reproduced accurately and at will.

Another object of the invention is to provide a medium for the culturing of a streptomycin-producing organism which can be made from readily available, substantially pure chemical substances.

An additional object is to provide an improved culture medium for the growing of Streptomyces griseus which will induce a high rate of production of streptomycin by the organism.

An additional object is to provide a method for growing Streptomyces griseus characterized by the uniform production of a high proportion of streptomycin in the medium.

An additional object is to provide a medium for the culturing of a streptomycin-producing organism free from non-essential materials in the medium that would interfere with subsequent recovery of streptomycin.

It has now been found that Streptomyces griseus may be grown readily and a high yield of streptomycin obtained by inoculating a culture medium, prepared carefully as hereinafter described and containing certain essential ingredients, with the organism and maintaining the inoculated medium under optimum conditions of temperature and pH. The medium and method are adaptable to the growing of Streptomyces griseus by either surface or submerged culture methods. Following the period of culturing of the microorganism, streptomycin may be recovered from the brew in any desired manner.

In preparing the medium of the present invention, a water-soluble carbohydrate is utilized as a source of carbon and hydrogen for the microorganisms and ammonium salts furnishing ammonium ions are utilized as a source of nitrogen. Further essential ingredients of the medium are salts furnishing the lactate anion, the mode of utilization of which by the organism is not entirely clear, the potassium cation and the bivalent zinc and magnesium cations. Bivalent cations of iron and manganese, and in some instances, of copper, have each been found to be desirable additaments to the medium and are frequently included for best results. The carbohydrate and salts which furnish the ions mentioned are dissolved in water and the solution buffered with a phosphate buffer. Culturing of the microorganism is carried out under carefully controlled conditions of temperature and pH.

Carbohydrates used in preparing the medium may include monosaccharides, such as glucose, d-mannose, d-galactose and mannitol, and polysaccharides, such as maltose, dextrin, glycogen and starch, which are hydrolyzed readily under the reaction conditions to yield monosaccharides. The concentration of monosaccharide, or of polysaccharide in terms thereof, in the medium should be between about 0.01 and 0.6 molal, preferably between about 0.02 and 0.2 molal. It has been found that, although a luxuriant growth of Streptomyces griseus is obtained using a concentration of monosaccharide as high as 0.5 molal, the production of streptomycin is not as great as when using from 0.02 to 0.2 molal carbohydrate. In the lower ranges of carbohydrate concentration mentioned and especially below a concentration of 0.02 molal, the production of streptomycin again falls off appreciably.

The phosphate buffer used should be selected so as to provide an initial pH of the mixture of between about 6.5 and about 7.5, preferably between about 6.9 and about 7.1. A 0.05 molal concentration of a mixture of 70 parts by weight of hydrated dipotassium phosphate and 30 parts of anhydrous monopotassium phosphate has been used with entire satisfaction.

A sodium phosphate may be substituted for the potassium phosphate in the buffer and potassium added as some other water-soluble salt thereof, such as the sulfate, chloride or nitrate.

It appears that phosphate ion is also essential to the production of a high proportion of streptomycin in the medium. Satisfactory results have been obtained with a concentration of phosphate of from about 0.001 to 0.2 molal. Best results are obtained at a phosphate concentration of from about 0.005 to 0.01 molal. At or above about 0.5 molal concentration, growth and production are inhibited. Below about 0.005 molal concentration, growth of the organism and production of streptomycin retarded.

It appears that potassium ion is also essential for growth of the organism and production of streptomycin. Satisfactory results are obtained with a concentration of potassium of from about 0.001 to about 0.2 molal. Best production of streptomycin is obtained using a concentration from about 0.01 to about 0.1 molal. At or above a concentration of about 0.5 molal or above, growth of the organism and production of streptomycin are inhibited. Below about 0.01 molal concentration, growth and production are retarded.

The presence in the medium of from about a 0.003 to about a 0.2 molal, preferably from about 0.02 to about 0.2 molal, concentration of a lactate, either as ammonium lactate, sodium lactate, or other water-soluble salt furnishing lactate ions, has a favorable influence on both the growth of Streptomyces griseus and the production of streptomycin thereby. Concentrations of ammonium lactate greater than about 0.2 molal tend to inhibit growth of the organism while, at a concentration of about 0.02 molal or somewhat less, both growth and streptomycin production are related directly to the amount of ammonium lactate present. At a concentration of ammonium lactate of about 0.003 molal or less there is little or no production of streptomycin whereas in the absence of ammonium lactate there is no growth of the organism.

When nitrogen is supplied to the medium in the form of ammonium ion using ammonium nitrate, best results are obtained using a concentration greater than about 0.0005 molal, preferably from about 0.0005 to about 0.005 molal. The growth of the organism is greatly retarded at concentrations below this range and little or no advantage is to be gained by using more than this amount. Nitrogen, in the form of nitrate or nitrite, does not appear to be utilized by this organism. Organic nitrogen compounds such as urea, aniline, and amino acids are likewise of little value.

Magnesium sulfate or other soluble salt furnishing magnesium ions is included in the medium at a concentration of from about 0.005 to about 0.1 molal. Excellent growth of the organism is obtained at concentrations of magnesium sulfate as low as 0.0005 molal but little or no production of streptomycin is observed at these lower concentrations.

Soluble zinc salts which furnish bivalent zinc cations are included in the medium at a concentration of from about $5 \times 10^{-5}$ to about $1 \times 10^{-3}$ molal. Production of streptomycin and growth of the microorganism are seriously retarded at concentrations of zinc both above and below this range.

Although manganous and ferrous ions do not appear to be essential for the growth of Streptomyces griseus, they are effective in influencing the organism to produce a high yield of streptomycin and may be included in the medium, if desired. Water-soluble manganous salts are usually employed at a concentration of from about $1 \times 10^{-4}$ to about $5 \times 10^{-4}$ molal. When used at a concentration as high as 0.05 molal, growth of the organism is inhibited. Water-soluble ferrous salts are usually employed at a concentration of from about $5 \times 10^{-6}$ to about $1 \times 10^{-3}$ molal, preferably from about $5 \times 10^{-5}$ to about $5 \times 10^{-4}$ molal. Little stimulation of growth of streptomycin due to iron is observed at concentrations of ferrous salts outside these limits and the growth of Streptomyces griseus is seriously inhibited at concentrations both higher and lower than those given.

Water-soluble cupric salts may frequently be included to advantage at low concentrations in the medium although luxuriant growth of the organism and moderately high yields of streptomycin are obtained without the addition of such copper salts. Cupric sulfate or other water-soluble salt furnishing cupric ions, when so employed, is included at a concentration of from about $5 \times 10^{-10}$ to about $5 \times 10^{-5}$ molal. It has been observed that within this range certain concentrations of cupric sulfate are more effective in increasing the yield of streptomycin than are other concentrations but the significance of this observation is not entirely clear. It is also apparent that in many instances sufficient copper will be present in the form of impurities in certain of the other ingredients used in preparing the medium to provide an optimum concentration of cupric ions.

In addition to the above mentioned ingredients, it is sometimes advantageous to include in the medium small amounts of calcium carbonate to neutralize excess acidity which may develop during the growth of the organism and thus to assist the phosphate buffer in maintaining the pH of the medium near the neutral point. Although not essential ingredients of the medium, certain other inorganic salts, such as those of molybdenum, mercury (ic), cobalt (ous), strontium, arsenic and tungsten, may often be included in the medium to advantage.

It is to be understood that the ionic constituents mentioned previously may be included in the medium in the form of any soluble salt which will yield such constituent, and it is, of course, to be further understood that substances toxic to the organism should be omitted. Such toxic substances include the cyanide, sulfocyanate, fluoride and other anions known to be generally toxic to organisms. Water-soluble substances which will react together in aqueous solution at the concentrations employed to form an insoluble precipitate are also preferably avoided. Suitable salts of the metals employed include the sulfates, chlorides, phosphates, nitrates and acetates.

The medium is prepared readily by dissolving the carbohydrate, lactate and inorganic salts employed in distilled water and sterilizing the mixture, e. g., by heating at 120° C. under pressure for about twenty minutes. During the sterilization a certain amount of turbidity may develop or a slight precipitation may occur in the medium, but this is not disadvantageous. Any calcium carbonate employed will, of course, remain largely undissolved. The sterilized medium is then inoculated with *Streptomyces griseus* and the organism cultured either by surface culture or submerged culture methods at a temperature of from about 22° to about 32° C., preferably at a temperature of from about 26° to about 30° C. A maximum concentration of streptomycin is usually obtained in from three to ten days. Under such conditions, a concentration of from 140 to 381 Waksman units of streptomycin per milliliter of culture medium is obtained readily. Streptomycin can be recovered from the brew in any one of a number of conventional methods. Certain advantages of the invention are apparent from the following examples which are given by way of illustration only and are not to be construed as limiting.

*Example 1*

A solution was prepared by dissolving ten grams (0.056 mol) of glucose, 2.38 grams (0.0175 mol) of monopotassium phosphate, 5.65 grams (0.0248 mol) of hydrated dipotassium phosphate, 4 grams (0.05 mol) of ammonium nitrate, 3.3 grams (0.025 mol) of ammonium sulfate, 2.5 grams (0.01 mol) of hydrated magnesium sulfate, 11.2 grams (0.1 mol) of sodium lactate, 0.1435 gram ($5 \times 10^{-4}$ mol) of hydrated zinc sulfate, 0.0139 gram ($5 \times 10^{-5}$ mol) of hydrated ferrous sulfate, 0.0845 gram ($5 \times 10^{-4}$ mol) of hydrated manganese sulfate, and 0.000159 gram ($1 \times 10^{-6}$ mol) of anhydrous cupric sulfate in 1,000 milliliters of distilled water. The pH of the solution was 6.95. Culture flasks were filled with this solution to a depth of about two centimeters and the flasks and contents sterilized by heating at 120° C. under pressure for twenty minutes. Inoculum of viable spores and mycelium of *Streptomyces griseus* was introduced aseptically into each of the containers and the cultures allowed to grow for ten days at about 26° C. and about 40 per cent relative humidity. The amount of streptomycin in each of the culture flasks was then determined by the paper-disc plate method (Jour. Bact. 50 701 (1945)) and the average amount was found to be 165 units per milliliter of medium.

*Example 2*

A medium was prepared substantially as in Example 1 and sterilized by heating at 120° C. for fifteen minutes. The sterilized medium was placed in a glass-lined tank equipped for agitation and aeration. The culture medium was inoculated with viable spores and mycelium of *Streptomyces griseus* and the mixture agitated and aerated for three days at 26° C. The mixture then contained 60 units of streptomycin per milliliter of medium.

*Example 3*

The procedure of Example 1 was repeated using 10 grams of glucose, 2.38 grams of monopotassium phosphate, 5.65 grams of hydrated dipotassium phosphate, 4 grams of ammonium nitrate, 0.25 gram of hydrated magnesium sulfate, 11.2 grams of sodium lactate, 0.143 gram of hydrated zinc sulfate, 0.014 gram of hydrated ferrous sulfate, 0.084 gram of hydrated manganous sulfate, 0.00016 gram of anhydrous cupric sulfate and 1000. milliliters of water. A yield of 180 units of streptomycin per milliliter of medium was obtained in the medium.

*Example 4*

The procedure of Example 3 was repeated except that only 6.10 grams of sodium lactate was used. The yield of streptomycin was 131 units per milliliter of medium.

*Comparative Example 1*

The procedure of Example 3 was repeated but sodium lactate was omitted entirely from the medium. The streptomycin obtained amounted to 28 units per milliliter of medium.

*Example 5*

Example 3 was repeated except that the four grams of ammonium nitrate was replaced by 3.3 grams of ammonium sulfate. A streptomycin production of 137 units per milliliter of medium was obtained.

*Comparative Example 2*

When sodium lactate was omitted from the medium as used in Example 5, a streptomycin production of only 46 units per milliliter of medium was obtained.

We claim:

1. A process for the production of streptomycin as defined in claim 6 in which the medium consists essentially of an aqueous solution of a fermentable carbohydrate and a mixture of non-toxic compounds which yield lactate, phosphate, ammonium, magnesium, potassium, zinc and ferrous ions, which medium is substantially free from proteins and hydrolytic products of proteins.

2. A process for the production of streptomycin as defined in claim 6 in which the medium consists essentially of an aqueous solution of a fermentable carbohydrate and a mixture of non-toxic compounds which yield lactate, ammonium, magnesium, potassium, zinc, ferrous and manganous ions, which medium is substantially free from proteins and hydrolytic products of proteins.

3. A process for the production of streptomycin as defined in claim 6 in which the medium consists essentially of an aqueous solution of a fermentable carbohydrate and a mixture of nontoxic compounds which yield lactate, ammonium, magnesium, potassium, zinc, ferrous, manganous and cupric ions, which medium is substantially free from proteins and hydrolytic products of proteins.

4. A process for the production of streptomycin which comprises the cultivation of a substantially pure culture of a viable strain of the organism *Streptomyces griseus* at a temperature between approximately 22 and approximately 32 degrees centigrade upon a medium consisting essentially of an aqueous solution of a fermentable carbohydrate and a mixture of nontoxic compounds which yield lactate, phosphate, ammonium, magnesium, potassium and zinc ions and is substantially free from proteins and hydrolytic products of proteins and is buffered to a pH between approximately 6.5 and approximately 7.5, and subsequently recovering the streptomycin produced therein.

5. A process for the production of streptomycin which comprises the culture of *Streptomyces griseus* at a temperature between approximately 22 and approximately 32 degrees centigrade upon a medium consisting essentially of the following substances in approximate concentrations in terms of mols per liter within the ranges specified:

| | |
|---|---|
| Glucose | 0.01 to 0.6 |
| Monopotassium phosphate and dipotassium phosphate | 0.001 to 0.2 |
| Ammonium nitrate | 0.0005 to 0.005 |
| Magnesium sulfate | 0.005 to 0.1 |
| Sodium lactate | 0.02 to 0.2 |
| Zinc sulfate | $5 \times 10^{-5}$ to $1 \times 10^{-3}$ | which medium is substantially free from proteins and hydrolytic products of proteins and is buffered to a pH between approximately 6.5 and approximately 7.5, and subsequently recovering the streptomycin produced therein.

6. A process for the production of streptomycin which comprises the cultivation of a substantially pure culture of a viable streptomycin-producing strain of the organism *Streptomyces griseus* upon a medium consisting essentially of an aqueous solution of a fermentable carbohydrate and a mixture of nontoxic compounds which yield lactate, phosphate, ammonium, magnesium, potassium and zinc ions and which is substantially free from proteins and hydrolytic products of proteins, and subsequently recovering the streptomycin produced therein.

7. A process as defined in claim 6 in which the fermentable carbohydrate is glucose.

8. A process as defined in claim 6 in which the fermentable carbohydrate is glucose and its concentration in the medium is between approximately 0.01 and approximately 0.6 mole per liter.

HALBERT H. THORNBERRY.
HARRY W. ANDERSON.

REFERENCES CITED

The following references are of record in the file of this patent:

Waksman and Curtis, Soil Science, 8, Aug. 1919, pages 81, 95.

Levine, A Compilation of Culture Media (1930), Williams & Wilkins Co., Baltimore, pp. 158 to 160, 221, 433.

Schatz et al., "Streptomycin," Proc. Soc. Exp. Biol. & Med., Jan. 1944, page 67.

Smith, Industrial Mycology, 2 ed., Edw. Arnold & Co. Ltd., London (1942), pp. 171 to 173.

Schatz & Waksman, Proc. National Acad. of Sciences, 31, 5, May 1945, pp. 130 to 134.

Waksman & Schatz, "Streptomycin," Jr. Am. Pharm. Assn., XXXIV, 11, Nov. 1945, pp. 275, 276.

Waksman et al., Jour. Bact., 51 (1946), pp. 753 to 759.